United States Patent [19]
Schulze et al.

[11] 3,821,323
[45] June 28, 1974

[54] SELECTIVE HYDROGENATION OF MINOR AMOUNTS OF ACETYLENE IN A GAS MIXTURE CONTAINING MAJOR AMOUNTS OF ETHYLENE

[75] Inventors: Gerhard Schulze, Ludwigshafen; Artur Sliwka, Kirchheim; Georg Wittmann, Ludwigshafen, all of Germany

[73] Assignee: Badische Anilin- & Soda-Fabrik Aktiengesellschaft, Ludwigshafen/Rhein, Germany

[22] Filed: Nov. 14, 1972

[21] Appl. No.: 306,288

[52] U.S. Cl............... 260/677 H, 252/457, 252/460
[51] Int. Cl............................................. C07c 11/00
[58] Field of Search.................... 260/677 A, 677 H

[56] References Cited
FOREIGN PATENTS OR APPLICATIONS

| | | | |
|---|---|---|---|
| 1,213,839 | 4/1966 | Germany | 260/677 H |
| 1,392,376 | 2/1965 | France | 260/677 H |

Primary Examiner—Delbert E. Gantz
Assistant Examiner—Juanita M. Nelson
Attorney, Agent, or Firm—Johnston, Keil, Thompson & Shurtleff

[57] ABSTRACT

Selective gas-phase hydrogenation of minor amounts of acetylene in a gas mixture containing major amounts of ethylene, using a palladium-on-silica gel catalyst which contains zinc.

7 Claims, No Drawings

SELECTIVE HYDROGENATION OF MINOR AMOUNTS OF ACETYLENE IN A GAS MIXTURE CONTAINING MAJOR AMOUNTS OF ETHYLENE

The present invention relates to a process for the selective gas-phase hydrogenation of minor amounts of acetylene in a gas mixture containing major amounts of ethylene using a palladium-on-silica gel catalyst.

In the manufacture of ethylene from hydrocarbons by pyrolysis and subsequent working up of the cracked gases there are obtained ethylene-rich fractions in which the content of acetylene is still too high for further processing. For example, when ethylene is used for the manufacture of polyethylene, the amount of acetylene contained in the ethylene feed should not be more than 10 ppm. The removal of acetylene from gas mixtures containing mainly ethylene is most advantageously carried out by selective catalytic hydrogenation. Such selective catalytic hydrogenation is particularly difficult to effect because only small quantities of acetylene are present beside the large quantities of ethylene, and these small quantities of acetylene must be hydrogenated as completely as possible without causing major losses of ethylene.

Catalysts known for use in such hydrogenations include iron, cobalt, nickel, platinum, rhodium, copper and combinations thereof such as nickel/copper, nickel/chromium and nickel/cobalt/chromium. The hydrogenation of acetylene in gas mixtures containing mainly ethylene is usually carried out industrially by means of palladium catalysts which may contain silver, copper, gold, iron, chromium or other platinum metals such as rhodium and ruthenium. The palladium and other active ingredients are usually supported on carriers. Carriers which have been used include activated alumina, superheated alumina having a specific porous structure and texture, e.g., $\alpha\text{-}Al_2O_3$, and consolidated diatomaceous earth. Silica gel has also been specified as carrier in connection with the hydrogenation of acetylene. For example, German Published Application No. 1,290,930 discloses a process for the removal of small amounts of acetylene from mixtures of lower hydrocarbons containing mainly ethylene by selective hydrogenation in the presence of a palladium-on-silica gel catalyst having an internal surface area of from 250 to 400 $m^2/g$. However, this process suffers from the drawback that the gas mixture entering the reactors must have a relatively high inlet temperature. Furthermore, so-called polymer oil, which is produced during hydrogenation as an unwanted by-product, is formed to such an extent in this process that it tends to disrupt the process, since it is deposited on the catalysts and thus reduces their activity. Other difficulties may occur as a result of the formation of polymer oil when the gas mixture leaving the hydrogenation is further processed, for example by low-temperature distillation, due to deposition of the polymer oil in, say, columns or heat exchangers. Regeneration of the catalyst and cleaning of the fouled columns and heat exchangers, however, entails stoppages and production losses. Thus in prior art hydrogenations, operations normally have to be stopped twice a month or so on account of the formation of polymer oil (cf. German Published Application No. 1,171,901, column 3). In another known process, the deposition of polymer oils during further processing, for example low-temperature distillation, of the gas mixture leaving the hydrogenation zone is prevented by removing said polymer oils from said gas mixture before said processing by passing the gas mixture through a bed of aluminum oxide and/or silica gel. However, this procedure is also relatively costly.

It is an object of the invention to provide a process for the selective gas-phase hydrogenation of small amounts of acetylene in a gas mixture containing major amounts of ethylene, in which the acetylene is hydrogenated highly selectively and polymer oils are formed only in very small quantities.

In accordance with the present invention this and other objects and advantages are achieved in a process for the selective gas-phase hydrogenation of small amounts of acetylene in a gas mixture containing major amounts of ethylene, using a palladium-on-silica gel catalyst, wherein the palladium-on-silica gel catalyst used for said selective gas-phase hydrogenation additionally contains zinc.

Our new process makes it possible to hydrogenate small amounts of acetylene contained in gas mixtures consisting mainly of ethylene in a highly selective manner. With our process, it is possible to reduce the acetylene content to below 2 ppm. Polymer oils capable of being deposited on the catalyst or of fouling columns and heat exchangers are formed to a such a small extent that the said hydrogenation may be carried out over a period of more than 200 days without stoppage. When a catalyst which has been regenerated after an on-stream period of more than 200 days is re-used, on-stream times of more than 200 days are again possible before it is necessary to stop the process, the amount of polymer oil formed being as small as that formed during the first period of operation. Another advantage of the process is that the gas mixture entering the reactor may have relatively low inlet temperatures, for example temperatures of from plus 15° C.

Hydrogenation may be carried out in the presence or absence of carbon monoxide. Where hydrogenation is carried out in the presence of carbon monoxide, it is preferred to operate in such a manner that the feedstock containing mainly ethylene contains from 0.05 to 5 ppm and preferably from 0.05 to 4 ppm and more preferably from 0.1 to 1 ppm, by volume, of carbon monoxide. Carbon monoxide levels of more than 5 ppm by volume are also possible but are harmful and undesirable in many applications of the ethylene-containing gas mixture and must therefore be removed at extra cost. On the other hand, carbon monoxide levels of less than 5 ppm by volume are usually easy to remove, for example by stripping in a low-temperature distillation column. German Published Application No. 1,568,262 reveals that the selectivity of a palladium-on-aluminum oxide catalyst may be increased by using ethylene-containing gas mixtures containing from 5 to 400 ppm by volume of carbon monoxide and that at these carbon monoxide levels the hydrogenation may be carried out with equal success over a larger temperature range. However, this process has the disadvantage that relatively high carbon monoxide levels are necessary in the ethylene-containing gas mixture, which in turn necessitates higher inlet temperatures and working temperatures, which in turn favor the formation of polymer oils.

In our process, the internal surface area of the silica gel carrier is not critical. The internal surface area of the said carrier may be, say, from 25 to 400 $m^2/g$. It is surprising that the internal surface area of silica gel used as carrier may vary within such wide limits, since German Published Application No. 1,290,930 discloses the use of a carrier of silica gel having an internal surface area of from 250 to 400 m²g as being particularly advantageous.

The supported catalyst used in the present process generally has a palladium content of from 0.001 to 1 percent and preferably from 0.005 to 0.25 percent by weight based on the total supported catalyst. The zinc content is suitably from 0.0005 to 2.5 percent and preferably from 0.001 to 1 percent by weight based on the total supported catalyst.

The ratio of palladium to zinc is generally in the range 25:1 to 0.1:1 and preferably from 20:1 to 0.15:1, by weight.

It is particularly advantageous to use catalysts in which, for a given palladium content $x$ (in percent by weight based on the total supported catalyst), the zinc content (in percent by weight based on the palladium content) is in the range from $y_1$ to $y_2$, where the lower limit $y_1$ is equal to 387.75 × plus 3.06 and the upper limit $y_2$ is equal to 612.25 × plus 96.94.

The supported catalyst used in the process of the invention may be prepared for example by impregnating or spraying silica gel with an aqueous solution of palladium salts and an aqueous solution of zinc salts followed by drying, for example at from 100° to 110° C. It is usual to employ aqueous solutions of palladium and zinc salts in which these salts have the same anions. However, it is also possible to use palladium and zinc salts in which the anions of the zinc salts differ from those of the palladium salts. Suitable palladium and zinc salts are for example the nitrates and chlorides. The nature of the anion is not critical.

It is advantageous when using the catalysts for the first time to reduce the active components with hydrogen or mixtures of nitrogen and hydrogen at temperatures ranging from room temperature to about 150° C before passing in the gas mixture to be hydrogenated. Alternatively, the catalyst may be reduced by introducing a mixture of hydrogen and the gas mixture to be hydrogenated.

The inlet temperature of the gas mixture entering the hydrogenation zone is generally in the range 15° to about 70° C and preferably between 25° and 45° C. Hydrogenation is carried out at atmospheric or elevated pressures, for example pressures ranging from 1 to 30 atmospheres. The ratio of hydrogen to acetylene is generally in the range 1.5:1 to 2.5:1, preferably 1.7:1 to 2.2:1 and more preferably from 1.8:1 to 2.1:1, by volume.

The gas mixture used for the hydrogenation and containing a major proportion of ethylene generally has a content of ethylene of at least 50 percent by volume. In addition to ethylene, these mixtures usually contain ethane. Our process is particularly suitable for the hydrogenation of ethylene/ethane mixtures having an acetylene content of from about 0.2 to 2 percent by volume. The gas mixtures to be hydrogenated in the process of the invention are obtained for example by cracking petroleum hydrocarbons to ethylene in the presence of steam at temperatures of between 700° and 900° C followed by the removal of an ethylene/ethane fraction from the resulting cracked gas mixture.

In the following Examples the parts by volume of gas are measured under standard conditions of temperature and pressure.

EXAMPLE 1

There are passed through a hydrogenation reactor containing the catalyst described below, 2,400 parts by volume of a gas per part by volume of catalyst per hour, which gas is composed of 75 parts by volume of ethylene, 25 parts by volume of ethane, 1.62 parts by volume of hydrogen, 0.93 part by volume of acetylene and 1.0 ppm of carbon monoxide, the gas being at a pressure of 27 atmospheres. At the commencement of hydrogenation the inlet temperature of the gas to be hydrogenated is 25° C. After an on-stream time of 150 days the inlet temperature is 34° C and the outlet temperature is 86° C. After a further 50 days, the inlet temperature is 44° C and the outlet temperature 95° C. The gas leaving the hydrogenation reactor has an acetylene content of less than 2 ppm by volume. Throughout the total on-stream time of 200 days the proportion of polymer oils formed was less than 1 ppm by weight.

The catalyst used was prepared by impregnating 100 l of silica gel having a particle size of from 3 to 6 mm with 45 l of a solution containing a total of 35.5 g of palladium in the form of palladium nitrate and 28.4 g of zinc in the form of zinc nitrate. After drying for 10 hours at 105° C, the catalyst contains 0.355 g of palladium and 0.284 g of zinc per liter of catalyst. The content of palladium is 0.05 percent by weight and that of zinc 0.04 percent by weight based on the supported catalyst, or 80 percent by weight of zinc based on the palladium content in percent by weight. The catalyst has a bulk density of 710 g/l and an internal surface area of 53 m²/g.

If the process described in the first paragraph of this Example is repeated except that the zinc-free catalyst described in Example 1 of German Published Application No. 1,290,930 is used in place of the catalyst of the present invention, about 12 ppm by weight of polymer oil is formed. After an on-stream time of only 14 days, it is necessary to raise the inlet temperature from 50° to 90° C.

EXAMPLE 2

2,000 parts by volume of a gas per part by volume of catalyst are passed, per hour, over the catalyst described below at a pressure of 27 atmospheres. The gas consists of 75 parts of ethylene, 25 parts of ethane, 2.28 parts of hydrogen, 1.20 parts of acetylene and 0.32 ppm of carbon monoxide, by volume. The inlet temperature is 25° C and the outlet temperature is 98° C. The gas leaving the hydrogenation zone has a content of acetylene of 3 ppm. During hydrogenation, less than 1 ppm by weight of polymer oil is formed.

The catalyst used was made by impregnating 100 l of silica gel having a particle size of from 3 to 6 mm with 68 l of a solution of 2.8 g of palladium in the form of palladium chloride. After drying, the catalyst was reimpregnated with 60 l of an aqueous solution of 2.8 g of zinc in the form of zinc chloride and dried for 10 hours at 105° C. The resulting supported catalyst contained 0.005 percent w/w of palladium and 0.005 percent w/w of zinc, i.e. 100 percent w/w of zinc based on the palladium content of the catalyst. The catalyst had an internal surface area of 96 m²/g and a bulk density of 560 g/l.

EXAMPLE 3

2,000 parts by volume of gas per part by volume of catalyst are passed, per hour, through a hydrogenation reactor packed with the catalyst described below, at a pressure of 27 atmospheres. The gas consists of, by volume, 76 parts of ethylene, 24 parts of ethane, 1.48 parts of hydrogen, 0.82 part of acetylene and 0.10 ppm of carbon monoxide. The inlet temperature of the gas mixture entering the reactor is 15° C and its outlet temperature is 61° C. After an on-stream period of more than 200 days the inlet temperature is 45° C and the outlet temperature 90° C. The acetylene content of the gas leaving the reactor is less than 2 ppm by volume throughout the on-stream period. During hydrogenation less than 1 ppm by weight of polymer oils is formed.

The catalyst used was prepared by placing 100 l of silica gel having a particle size of from 4 to 6 mm in a rotary drum maintained at 90° C and spraying the silica gel with 15 l of an aqueous solution of 4.8 g of palladium in the form of palladium chloride followed by 15 l of an aqueous solution of 0.384 g of zinc in the form of zinc chloride, the total spraying time being 4 hours. After drying for 12 hours at 105° C the catalyst has a bulk density of 480 g/l. The catalyst contains 0.01 percent by weight of palladium and 0.0008 percent by weight of zinc or 8 percent w/w of zinc based on the palladium. The catalyst has an internal surface area of 126 m²/g.

EXAMPLE 4

A reactor is filled with the catalyst described below and, at a pressure of 27 atmospheres, 3,000 parts by volume of gas per part by volume of catalyst are passed through the reactor per hour, which gas consists of, by volume, 75 parts of ethylene, 25 parts of ethane, 1.82 parts of hydrogen, 0.83 part of acetylene and 3.0 ppm of carbon monoxide. The inlet temperature of the gas entering the reactor is 38° C and the outlet temperature of the gas leaving the reactor is 93° C. The acetylene content of the gas leaving the reactor is 3 ppm by volume. The amount of polymer oil formed is less than 1 ppm by weight.

The catalyst used was manufactured by placing 100 l of silica gel having a particle size of from 3 to 6 mm and an internal surface area of 290 m²/g in a rotary drum maintained at 90° C and spraying the silica gel with 15 l of an aqueous solution of 85.5 g of palladium in the form of palladium nitrate and 175.3 g of zinc in the form of zinc nitrate over a period of 2.5 hours. After drying at 105° C for 15 hours, the catalyst contains 0.18 percent w/w of palladium and 0.369 percent w/w of zinc or 205 percent w/w of zinc based on the palladium. The bulk density of the catalyst is 475 g/l.

EXAMPLE 5

3,600 parts by volume of gas per part by volume of catalyst as described below are passed, per hour, through a reactor packed with said catalyst, at a pressure of 27 atmospheres. The gas consists of, by volume, 76 parts of ethylene, 24 parts of ethane, 1.40 parts of hydrogen, 0.70 part of acetylene and 1.52 ppm of carbon monoxide. The inlet temperature of the gas is 44° C and its outlet temperature is 87° C. The acetylene content of the gas leaving the reactor is less than 2 ppm, while the content of polymer oil is less than 1 ppm by weight.

The catalyst used was prepared by placing 100 l of silica gel having a particle size of from 4 to 6 mm and an internal surface area of 130 m²/g in a rotary drum heated at 90° C and spraying said silica gel with 20 l of an aqueous solution of 115.2 g of palladium in the form of palladium nitrate and 115.2 g of zinc in the form of zinc nitrate over a period of 3 hours. After drying at 105° C for 12 hours, the resulting catalyst contains 0.24 percent w/w of palladium and 0.24 percent w/w of zinc. The content of zinc is 100 percent w/w based on that of palladium. The bulk density of the catalyst is 480 g/l.

EXAMPLE 6

2,700 parts by volume of a gas per part by volume of catalyst are passed, per hour, through a reactor containing said catalyst, at a pressure of 27 atmospheres. The gas consists of, by volume, 75 parts of ethylene, 25 parts of ethane, 1.90 parts of hydrogen, 0.90 part of acetylene and 0.74 ppm of carbon monoxide. The inlet temperature of the gas is 36° C and its outlet temperature is 91° C. The content of acetylene in the gas leaving the reactor is less than 3 ppm and the amount of polymer oil contained therein is less than 1 ppm by weight.

The catalyst used was obtained by placing 100 l of silica gel having a particle size of from 3 to 7 mm and an internal surface area of 25 m²/g in a rotary drum heated at 90° C and spraying said silica gel with 15 l of an aqueous solution of 86.9 g of palladium in the form of palladium nitrate and 142.2 g of zinc in the form of zinc nitrate, over a period of 2 hours. After drying, the catalyst contains 0.11 percent w/w of palladium and 0.18 percent w/w of zinc or 164 percent w/w of zinc based on the palladium. The bulk density is 790 g/l.

EXAMPLE 7

2,600 parts by volume of gas per part by volume of catalyst are passed, per hour, through a reactor containing said catalyst, at a pressure of 27 atmospheres. The gas consists of, by volume, 74 parts of ethylene, 26 parts of ethane, 1.76 parts of hydrogen, 0.88 part of acetylene and 0.60 ppm of carbon monoxide. The inlet temperature is 36° C and the outlet temperature 91° C. The gas leaving the reactor contains 2 ppm of acetylene and less than 1 ppm by weight of polymer oil.

The catalyst used was obtained by placing 100 l of silica gel having a particle size of from 3 to 6 mm and an internal surface area of 128 m²/g in a rotary drum heated at 90° C and spraying said silica gel, over 2 hours, with 12 l of an aqueous solution of 67.2 g of palladium in the form of palladium nitrate and 40.32 g of zinc in the form of zinc nitrate. After drying at 105° C for 10 hours, the catalyst obtained had a bulk density of 480 g/l. The catalyst contained 0.14 percent w/w of palladium and 0.084 percent of w/w of zinc. The proportion of zinc is 60 percent w/w based on the palladium content of the catalyst.

We claim:
1. A process for the selective gas-phase hydrogenation of minor amounts of acetylene in a gas mixture containing major amounts of ethylene using a palladium-on-silica gel catalyst, wherein the palladium-on-silica gel catalyst used for said selective gas-phase hydrogenation additionally contains zinc.

2. A process as set forth in claim 1, wherein the supported catalyst has a palladium content of from 0.001 to 1 percent by weight and a zinc content of from 0.0005 to 2.5 percent by weight.

3. A process as set forth in claim 1, wherein the supported catalyst has a palladium content of from 0.005 to 0.25 percent by weight and a zinc content of from 0.001 to 1 percent by weight.

4. A process as set forth in claim 3, wherein the ratio of palladium to zinc is from 25:1 to 0.1:1 by weight.

5. A process as set forth in claim 4 wherein said mixture contains at least 50 percent by volume of ethylene and from 0.2 to 2.0 percent by volume of acetylene.

6. A process as set forth in claim 5 wherein said gas mixture is passed to a hydrogenation zone at an inlet temperature at from 15° to 70° C.

7. A process as set forth in claim 5 wherein said gas mixture is passed to a hydrogenation zone at an inlet temperature at from 25° to 45° C.

* * * * *

UNITED STATES PATENT OFFICE
CERTIFICATE OF CORRECTION

Patent No. 3,821,323    Dated June 28, 1974

Inventor(s) Gerhard Schulze, Artur Sliwka, Georg Wittmann

It is certified that error appears in the above-identified patent and that said Letters Patent are hereby corrected as shown below:

In the heading insert --[30] Foreign Application Priority Data, November 15, 1971, Germany P 21 56 544.6--.

Signed and Sealed this sixteenth Day of September 1975

[SEAL]

Attest:

RUTH C. MASON
Attesting Officer

C. MARSHALL DANN
Commissioner of Patents and Trademarks